United States Patent
Kreibig

(10) Patent No.: US 9,533,244 B2
(45) Date of Patent: Jan. 3, 2017

(54) FILTER DEVICE

(71) Applicant: Hydac Filtertechnik GmbH, Sulzbach/Saar (DE)

(72) Inventor: Micha Kreibig, Rehlingen-Siersburg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/540,242

(22) Filed: Nov. 13, 2014

(65) Prior Publication Data

US 2015/0144549 A1    May 28, 2015

(30) Foreign Application Priority Data

Nov. 26, 2013   (DE) .................. 10 2013 019 807

(51) Int. Cl.
*B01D 35/30* (2006.01)
*B01D 29/21* (2006.01)

(52) U.S. Cl.
CPC .............. *B01D 35/30* (2013.01); *B01D 29/21* (2013.01); *B01D 2201/291* (2013.01); *B01D 2201/295* (2013.01); *B01D 2201/306* (2013.01); *B01D 2201/4092* (2013.01)

(58) Field of Classification Search
CPC ......... B01D 27/08; B01D 29/21; B01D 35/30; B01D 2201/295; B01D 2201/306; B01D 2201/291; B01D 2201/4092
See application file for complete search history.

(56) References Cited

U.S. PATENT DOCUMENTS

| | | | | |
|---|---|---|---|---|
| 751,918 A * | 2/1904 | Jagger | ............... | B01D 35/02 210/448 |
| 2,932,400 A * | 4/1960 | Scavuzzo | ............. | B01D 35/153 210/136 |
| 3,458,050 A * | 7/1969 | Cooper | ................. | B01D 35/02 210/448 |
| 3,753,500 A * | 8/1973 | Voegeli | ................. | B01D 35/02 210/446 |
| 3,794,168 A * | 2/1974 | Perkins | ............... | B01D 35/143 210/130 |
| 4,126,559 A * | 11/1978 | Cooper | ................. | B01D 29/15 210/445 |
| 5,603,900 A * | 2/1997 | Clark | ................... | B01D 29/012 210/321.75 |
| 5,643,448 A * | 7/1997 | Martin | ................ | B01D 29/114 210/232 |
| 5,779,903 A | 7/1998 | Smith et al. | | |

(Continued)

FOREIGN PATENT DOCUMENTS

WO    WO 2008/015100 A1    2/2008

*Primary Examiner* — Thomas M Lithgow
(74) *Attorney, Agent, or Firm* — Wenderoth, Lind & Ponack, L.L.P.

(57) ABSTRACT

A filter device has a filter housing having two separable housing parts (1 and 11) that can receive at least one filter element (21). The housing parts can be connected to one another by a coupling device (7). The filter element (21), or an adapter that can be connected to it, forms a functionally essential component of the coupling device (7). Only when the filter element (21) has been placed in its functional position within at least one of the housing parts (1, 11), can the housing parts (1, 11) be connected to form the filter housing of a functional filter device.

14 Claims, 3 Drawing Sheets

(56) References Cited

U.S. PATENT DOCUMENTS

| | | | | |
|---|---|---|---|---|
| 6,024,229 A * | 2/2000 | Ayers | ............... | B01D 29/15 |
| | | | | 210/443 |
| 6,146,527 A * | 11/2000 | Oelschlaegel | ......... | B01D 29/21 |
| | | | | 210/232 |
| 7,387,726 B2 * | 6/2008 | Wolf | ............... | B01D 29/055 |
| | | | | 210/232 |
| 8,123,831 B2 * | 2/2012 | Heikamp | ............ | B01D 46/003 |
| | | | | 123/198 E |
| 8,268,170 B2 * | 9/2012 | Core | ............... | B01D 29/21 |
| | | | | 210/232 |
| 8,801,927 B2 * | 8/2014 | Kocksch | ............ | B01D 35/30 |
| | | | | 210/232 |
| 2010/0059427 A1 * | 3/2010 | Petschl | ............ | B01D 27/101 |
| | | | | 210/133 |
| 2011/0100893 A1 * | 5/2011 | Kocksch | ............ | B01D 35/30 |
| | | | | 210/236 |

* cited by examiner

FILTER DEVICE

FIELD OF THE INVENTION

The invention relates to a filter device having a filter housing having at least two housing parts, which can be separated from one another to receive at least one filter element, and which can be connected to one another by a coupling device.

BACKGROUND OF THE INVENTION

Filter devices of this type are prior art and are used in a wide variety of fields. In the prior art, such devices are especially widely used in applications for cleaning operating fluids such as hydraulic fluids, fuels or lubricants, coolants and the like. Since the filter devices form important system components, proper functioning and filter performance are a prerequisite for the smooth operation of the respective systems. Taking into consideration the fact that malfunctions, which may include damages and failures, may result in very high costs, the functional reliability of the filter devices represents a significant economic factor.

SUMMARY OF THE INVENTION

In terms of this problem, an object of the invention is to provide a filter device of the type considered here, which is characterized by a high degree of operational reliability.

This object is achieved according to the invention by a filter device having a filter element accommodated in the filter housing, or an adapter associated therewith forming a functionally essential component of the coupling device. Only when the filter element has been placed in its functional position within at least one of the housing parts that the respective other housing part can be connected to this first housing part to form the filter housing of a functional filter device. On the one hand, since in the absence of a filter element, no connection between the housing parts is possible. Without a filter, the filter housing cannot be placed in an operational state, ensuring that a filter element is always installed. As a result, no risk of a functional failure exists as a result of operation without an inserted filter element. On the other hand, also ensured is that only a suitable filter element can be used, which can serve as a component of the coupling device due to the construction thereof. Operation with unsuitable filter elements that do not correspond to the required specifications is thereby excluded.

The coupling device can be advantageously designed such that the device has at least a first connecting element, which is a component of the respective one housing part, and has at least a second connecting element as a component of the respective other housing part. At least a third connecting element is provided, which third connecting element fixes the first and second connecting elements to one another as soon as the respective filter element is in a functional position. At the same time, the third connecting element can be a component of the filter element and/or a component of the adapter, which, when in its fixed position on the first and second connecting elements, allows the filter element to be coupled to the adapter at least in the functional position thereof.

In an especially advantageous manner, the third connecting element may be a component of the end cap of the filter element, which at least in part comprises the filter element material. The third connecting element is disposed such that it is concentric to the longitudinal axis of the filter element.

In the case of especially advantageous embodiments, the individual connecting elements are formed from threads that preferably each have an identical pitch with an identical thread formation. The coupling device with the connecting elements thereof thereby forms a screw connection, so that the connection of the housing parts can be implemented easily and conveniently by a screwing process.

In an especially advantageous manner, the respective thread, which forms the third connecting element, can be formed out of plastic, preferably out of the same material as the end cap. In the case of plastic threads thus formed, the plastic element of the thread system with which the filter element is associated, and which enters into threaded engagement with the threads of the housing parts, which are usually made out of metal, is replaced each time the filter element is changed. As a result, any kind of plastic including less wear-resistant plastic can be used for the end cap with its threads. In addition, in the case of plastic threads, no metal debris is formed during screwing processes, so that both wear and contamination within the interior of the housing are minimized.

The threads of the first and second connecting elements may be formed having essentially the same length. In a functional position of the filter element, the threads of the third connecting element essentially completely cover the respective other threads, which are meshed therewith.

In the case of the standard design of such a filter housing, the configuration may be such that the thread of the first connecting element leads to a releasable opening, which is a component of a housing pot as the one housing part. The thread of the second connecting element leads to this releasable opening or to the additional housing part adjacent thereto, which is a component of a housing head fitted on the housing pot and connected thereto by screwing to close off the opening externally.

In advantageous embodiments, the end cap of the respective filter element has a ring flange, which protrudes outward, and which divides the threads of the end cap into two thread sections. When the filter element is in the functional position in the filter housing, the one thread section meshes with the respective one connecting element, and the other thread section meshes with the respective other connecting element. The ring flange is in contact with the frontal wall sections of the adjacently disposed housing parts, with the wall sections being disposed such that they face one another.

In terms of the design of the end cap, the configuration may advantageously be such that the one or the other thread section leads out to the outside at the upper side or, respectively, at the underside of the end cap.

In especially advantageous embodiments, the one housing part, for example in the form of the housing pot, is provided with a fixing device on the outer circumference thereof for a seal. The seal is overlapped by wall elements of the respective other housing part, such as the housing head, as soon as the housing parts are connected to one another in their final position. The ring flange of the filter element, when viewed in the longitudinal direction thereof, is disposed above the seal oriented towards an inflow opening of the filter element.

The subject matter of the invention is also a filter element, which is preferably provided for a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
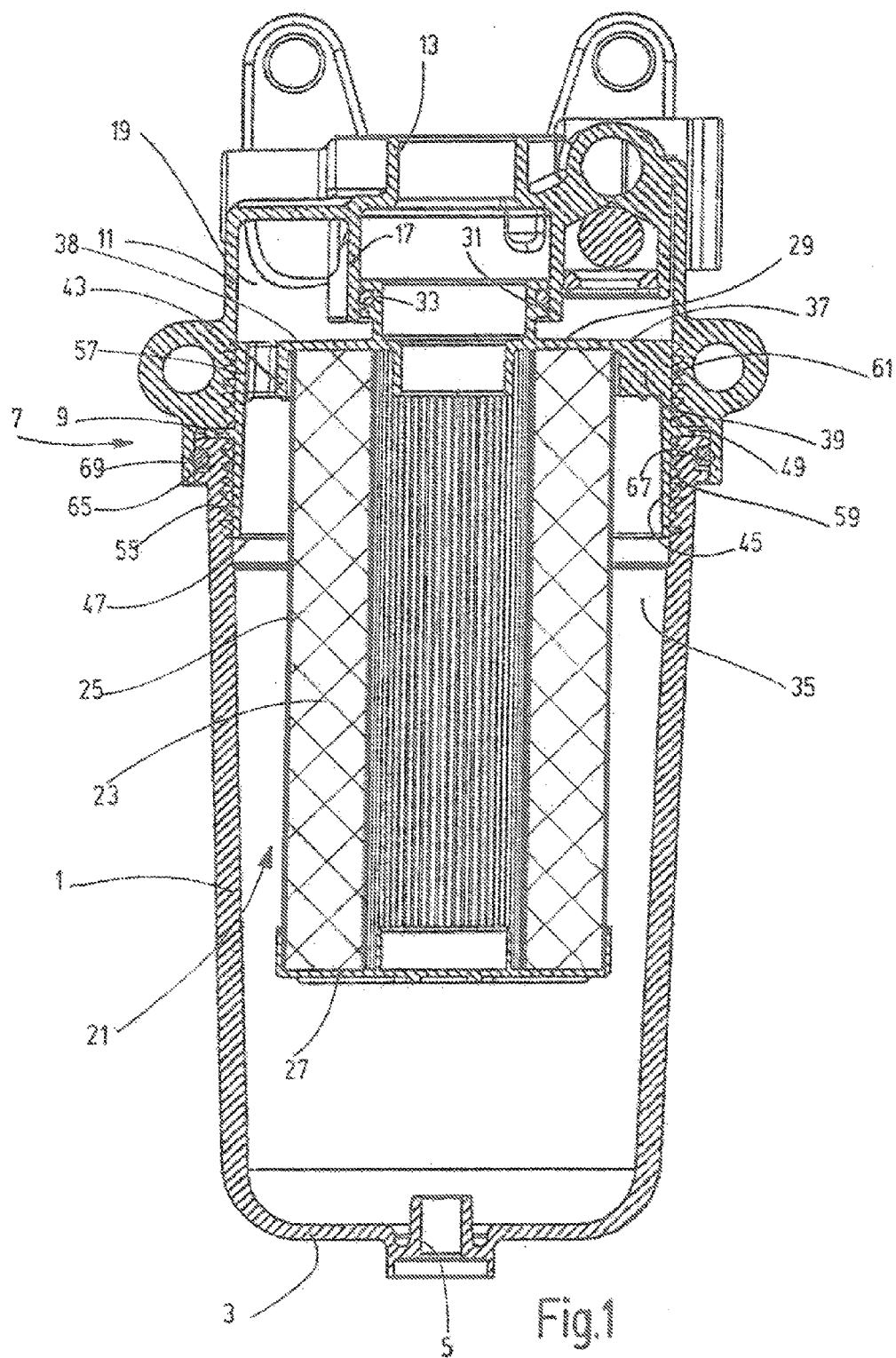
FIG. 1 is a side view in section of a filter device according to an exemplary embodiment of the invention.

The embodiment of the filter device according to the invention shown in its entirety in FIG. 1 has, as a housing part, a housing pot 1 in the form of a circular cylinder that tapers inward slightly towards the bottom 3 of the pot. The bottom 3 is closed, except for a centrally located housing discharge element 5, the closing member of which is not shown in FIG. 1. The housing pot 1 is connected at the upper opening 9 thereof via a coupling device 7 to a housing head 11 as the second housing part. The head 11 has connections for the supply and discharge of the appropriate fluids. In the figures, of these connections, only the centrally located inlet 3 is visible. An outlet for the discharge of the filtrate is located laterally on the head 11 and is not visible in the drawing. Fluid passages for the unfiltrate and filtrate are provided in the head 11, of which the fluid passage that is connected to the inlet 13 is formed by an inner cylinder 17 that is concentric to the longitudinal axis 15. The surrounding chamber 19 in the inner cylinder 17 is connected to the filtrate outlet.

A filter element 21 having a conventional, circular cylindrical design can be accommodated in the filter housing, which is formed by the filter pot 1 and filter head 11. The filter element has a hollow cylindrical shaped filter material 23, through which the fluid flows from the inner filter cavity that is surrounded by the filter material 23 and then outward during the filtering process. The fluid passes through a support structure 25 that encloses the filter material 23, which support structure is formed by a perforated shell member or a mesh pack. The filter material 23 is enclosed by an end cap 27 at one end, shown below in FIG. 1. An upper cap end 29 is located at the opposite end of the filter material 23. Both end caps 27, 29 are made of a plastic material, by injection molding.

The figures show the filter element 21 in its functional position, inserted into the filter housing 1, 11. The inner cylinder 17 of the head 11 overlaps a connecting part on the end cap 29 to form a fluid connection between the inlet 13 on the head 11 and the inner filter cavity of the filter element 21. This connecting part is formed by a projection that has the shape of a pipe socket 31. Pipe socket 31 projects from the flat upper side of the end cap 29 is concentric to the axis 15, and is sealed by a sealing ring 33 on the interior of the inner cylinder 17. The lower end of the pipe socket 31 leads into the inner filter cavity of the filter element 21 that forms the unfiltered side during the filtering process, from which the cleaned fluid passes to the chamber 35 surrounding the support structure 25, which forms the filtered side, after the fluid passes through the filter material 23. The cleaned fluid passes from this chamber 35 to the fluid chamber 19 located in the head 11. Fluid chamber 19 is connected to the fluid outlet (not visible) on the head 11.

The upper end cap 29 is designed as a one-piece injection molded part made of plastic, such that it forms an indispensable component of the coupling device 7. This means that, in the case that the filter element 21 having the special end cap 29 is absent, no connection is possible between the pot 1 and the head 11. Therefore the formation of a functional filter housing that is formed from the pot 1 and the head 11 is not possible. To form a component of the coupling device 7, the end cap 29 has a disk 37, which encloses the pipe socket 31 and which is flat on the upper side 38 thereof. From the underside of disk 37, an annular body 39 having a square cross section axially projects. The outer diameter of the annular body 39 is adapted to the inner diameter of the fluid chamber 19 of the head 11 and the inner diameter of the pot 1 in the region of the opening 9 thereof. The cylindrical inner surface 41 of the annular body 39 overlaps the associated edge section of the support structure 25 of the filter material 23. Gaps 43 are distributed in the annular body 39 such that they are spaced apart from one another as fluid passages between the chamber 35 of the pot 1 on the filtered side and the fluid chamber 19 in the head 11.

Figure 2:
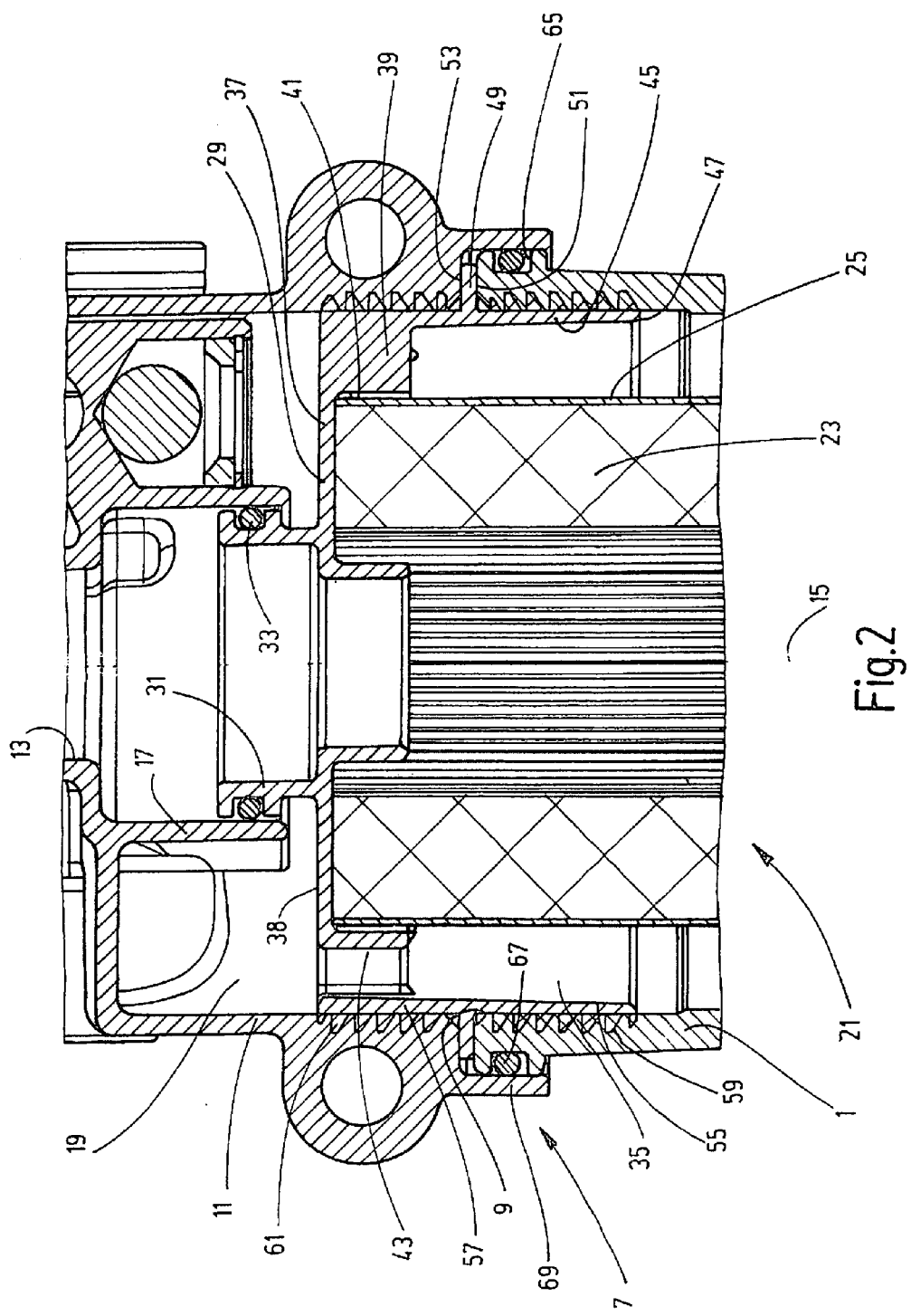
FIG. 2 is an enlarged, partial side view in section of the filter housing section having a coupling device between the housing pot and the housing head of FIG. 1.
Figure 3:
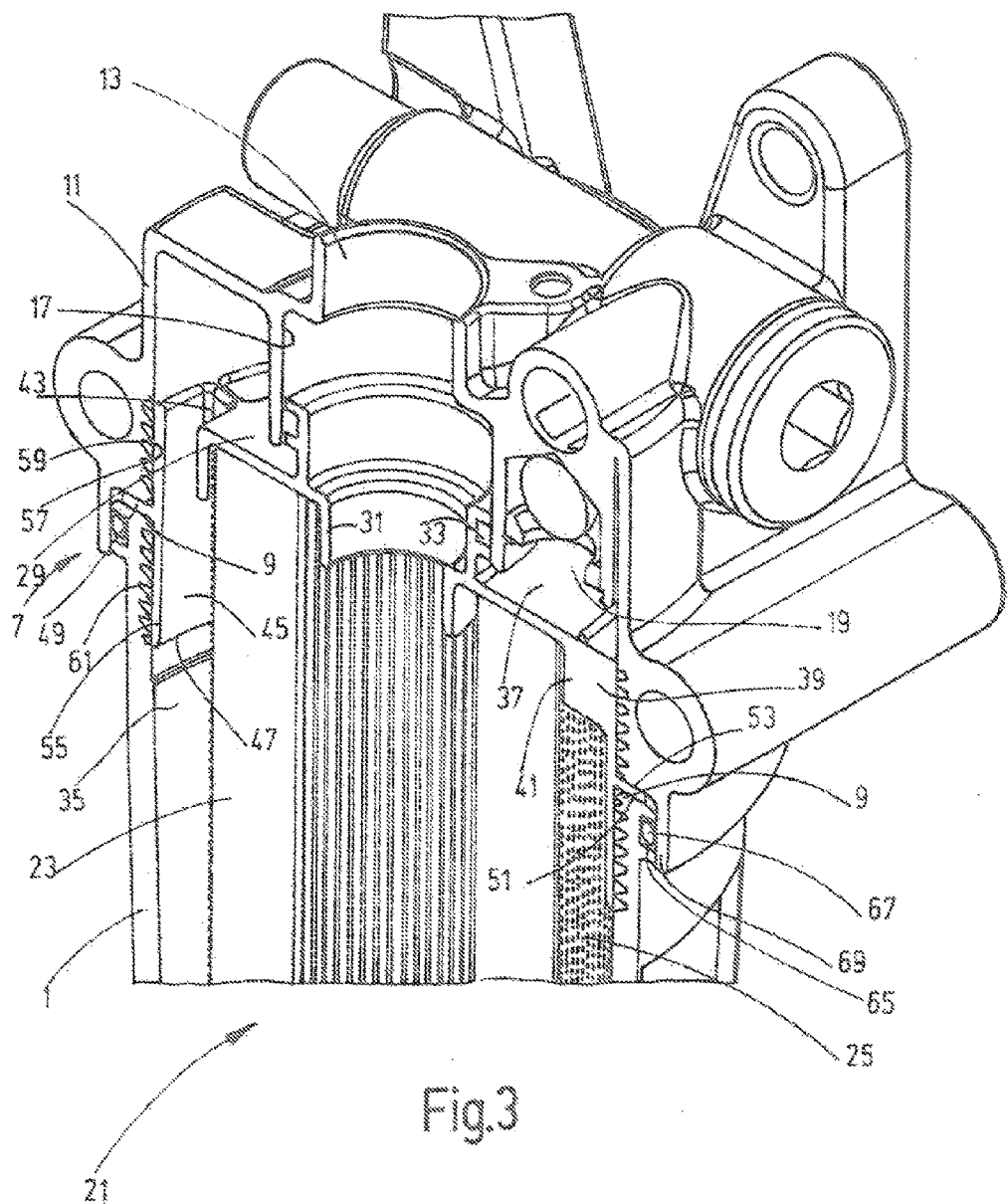
FIG. 3 is a partial perspective view in section of the upper housing part of the filter device of FIG. 1.

A sleeve-like extension 45 is connected to the underside of the annular body 39 of the end cap 29, which extension continues the outer diameter of the annular body 39 and extends axially as a sleeve body that is concentric to the axis 15. Extension 45 has a wall thickness that is slightly reduced towards the free end 47. With the annular body 39 and extension 45, a total axial extension is obtained for the end cap 29. The length of the total axial extension when measured from the end 47 to the upper side of the filter element 21, corresponds to approximately half of the diameter of the end cap 29. A radial projecting ring flange 49 is located approximately half way along the length between the end 47 and the upper side of the end cap 29. In the case of the functional position of the filter element 21 in the filter housing 1, 11 shown in the Figures, the ring flange 49 is in contact with a wall element 51 on the front surface at the edge of the opening 9 of the pot 1, and with a facing wall element 53 on the front surface on the head 11, when the pot 1 and the head 11 are connected to one another by the coupling device 7, see FIG. 2.

On the outside of the annular body 39 and of the extension 45, the end cap 29 forms a connecting element in the form of a thread for the coupling device 7. The connecting element having a first thread section 55 between the lower free end 47 and the ring flange 49, and a second thread section 57 between the ring flange 49 and the upper side of the disk 37 of the end cap 29. Both thread sections 55 and 57 have approximately the same length and are formed by an external thread having the same thread formation and pitch. A further thread 59 is formed on the interior of the pot 1, connecting to the opening 9, as an additional connecting element of the coupling device 7. A thread 61 is located on the head 11, extending from the wall element 53 at the front side, as an additional connecting element of the coupling device 7. These threads 59 and 61 likewise have the same thread formation and pitch as the threads formed by the thread sections 55 and 57 on the end cap 29. The axial length of the threads 59 and 61 are each formed by an internal thread on the pot 1 or, respectively, head 11.

In the case of this configuration, the coupling device 7 only allows a screwed connection between the pot 1 and the head 11 when the filter element 21 has been inserted into the housing 1, 11. The insertion process may be carried out such that the filter element 21 is screwed with the thread section 57 of the end cap 29 into the thread 51 in the head 11 until the ring flange 49 on the wall element 53 abuts the head 11.

The unit comprising the head 11 and filter element 21 thus formed can now be connected to the pot 1 in that the thread section 55 on the extension 45 of the end cap 29 is screwed into the thread 59 of the pot 1 until the ring flange 49 abuts the wall element 51 of the pot 1 on the front surface. As the Figures show, in the screw connection that is formed, the threads 59 and 61 on the pot 1 or, respectively, on the head 11 are essentially completely covered by the thread sections 59 and 61 of the end cap 29.

To form a seal between the pot 1 and the head 11 of the housing when the screw connection has been formed, an annular groove 35 is formed on the outside of the pot 1 in the wall region adjacent to the opening 9. A sealing element 67 is incorporated in groove 35. An axially projecting external ring 69 is located on the facing edge of the head 11. This external ring 69 is radially offset radially outward vis-à-vis the thread 61. The inner wall of external ring 69 overlaps the sealing element 67 to form the seal with the pot 1.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having first and second housing parts that are separable from one another, said first and second housing parts having first and second connecting threads, respectively, said first connecting thread leading to a releasable opening of said first housing part, said first housing part being a housing pot, said second connecting thread leading to a releasable opening of said second housing part, said second housing part being a housing head;
a filter element received in said filter housing when said first and second housing parts are connected to one another; and
a coupling being connected to said filter element inside said filter housing and forming an essential component for connecting said first and second housing parts such that only when said filter element is in a functional position thereof in one of said first and second housing parts can the other of said first and second housing parts be connected to form said filter housing that is functional, said coupling including a-third and fourth connecting threads engaging said first and second connecting threads, respectively, and connecting said first and second housing parts and said filter element.

2. A filter device according to claim 1 wherein
said third and fourth connecting threads are on said filter element in the functional position of said filter element when said third and fourth connecting threads are fixed on said first and second connecting threads, respectively.

3. A filter device according to claim 1 wherein
said third and fourth connecting threads are components of an end cap of said filter element and are concentric with a longitudinal axis of said filter element, said filter element including filter material.

4. A filter device according to claim 3 wherein
said coupling is formed of plastic with said end cap.

5. A filter device according to claim 1 where
each of said connecting threads have identical pitch with an identical thread formation.

6. A filter device according to claim 1 wherein
said coupling is formed of plastic.

7. A filter device according to claim 1 wherein
said first and second connecting threads have essentially equal lengths; and
said third and fourth connecting threads essentially completely cover said first and second connecting threads, respectively, when the respective connecting threads are intermeshed in the functional position of said filter element.

8. A filter device according to claim 1 wherein
said filter element comprises filter material and an end cap at least partially enclosing said filter material, said third and fourth connecting threads being on said end cap such that said first and second housing parts can only be fixedly connected with said filter element in the functional position in said first and second housing parts.

9. A filter device according to claim 1 wherein
said first and second connecting threads are internal threads;
said third and fourth connecting threads are external threads; and
said coupling extends axially and laterally inside along adjacent end portions of said first and second housing parts.

10. A filter device according to claim 9 wherein
said coupling is an end cap of said filter element.

11. A filter device, comprising:
a filter housing having first and second housing parts that are separable from one another, said first and second housing parts having first and second connecting threads, respectively;
a filter element received in said filter housing when said first and second housing parts are connected to one another; and
a coupling being connected to said filter element inside said filter housing and forming an essential component for connecting said first and second housing parts such that only when said filter element is in a functional position thereof in one of said first and second housing parts can the other of said first and second housing parts be connected to form said filter housing that is functional, said coupling including third and fourth connecting threads engaging said first and second connecting threads, respectively, and connecting said first and second housing parts and said filter element, said third and fourth connecting threads being components of an end cap of said filter element and being concentric with a longitudinal axis of said filter element, said filter element including filter material, said end cap including a ring flange protruding radially outwardly from said end cap between and separating said third and fourth connecting threads, said ring flange contacting first and second wall sections of said first and second housing parts, respectively, said first and second wall sections facing one another.

12. A filter element according to claim 11 wherein
said first connecting thread leads to a releasable opening of said first housing part, said first housing part being a housing pot; and
said second connecting thread leads to a releasable opening of said second housing part, said second housing part being a housing head.

13. A filter device according to claim 11 wherein
said first housing part comprises a fixing device with a seal on an outer circumference of said first housing part;

said second housing part has wall elements overlapping said seal when said first and second housing parts are connected; and said ring flange is disposed above said seal in a longitudinal direction of said filter housing and is oriented towards an inflow opening of said filter element.

14. A filter device, comprising:

a filter housing having first and second housing parts that are separable from one another, said first and second housing parts having first and second connecting threads, respectively;

a filter element received in said filter housing when said first and second housing parts are connected to one another; and a coupling being connected to said filter element inside said filter housing and forming an essential component for connecting said first and second housing parts such that only when said filter element is in a functional position thereof in one of said first and second housing parts can the other of said first and second housing parts be connected to form said filter housing that is functional, said coupling including third and fourth connecting threads engaging said first and second connecting threads, respectively, and connecting said first and second housing parts and said filter element, said third and fourth connecting threads being components of an end cap of said filter element and being concentric with a longitudinal axis of said filter element, said filter element including filter material, said third connecting thread facing radially outwardly on a lower side of said end cap, said fourth connecting thread facing radially outwardly on an upper side of said end cap.

* * * * *